(12) United States Patent
Tedesco et al.

(10) Patent No.: US 8,595,060 B2
(45) Date of Patent: *Nov. 26, 2013

(54) BILLING STATEMENT CUSTOMER ACQUISITION SYSTEM

(75) Inventors: Daniel E. Tedesco, New Canaan, CT (US); James A. Jorasch, Stamford, CT (US); Jay S. Walker, Ridgefield, CT (US)

(73) Assignee: eBay Inc., San Jose, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 13/436,786

(22) Filed: Mar. 30, 2012

(65) Prior Publication Data

US 2012/0197710 A1    Aug. 2, 2012

Related U.S. Application Data

(63) Continuation of application No. 13/113,587, filed on May 23, 2011, now Pat. No. 8,458,020, which is a continuation of application No. 11/423,299, filed on Jun. 9, 2006, now abandoned, which is a continuation of application No. 11/084,431, filed on Mar. 18, 2005, now abandoned, which is a continuation of application No. 09/100,684, filed on Jun. 19, 1998, now Pat. No. 6,898,570, which is a continuation-in-part of application No. 08/982,149, filed on Dec. 1, 1997, now Pat. No. 6,196,458.

(51) Int. Cl.
*G06Q 30/00* (2012.01)

(52) U.S. Cl.
USPC .......... 705/14.1; 705/14.16; 705/40; 235/375

(58) Field of Classification Search
USPC ......................... 705/14.1, 14.16, 40; 235/375
See application file for complete search history.

(56) References Cited

U.S. PATENT DOCUMENTS 5,905,246 A * 5/1999 Fajkowski ..................... 235/375

FOREIGN PATENT DOCUMENTS

| JP | 5-257950 | * 10/1993 |
| JP | 10-187318 | * 7/1998 |

OTHER PUBLICATIONS

Krauss, Jeffrey, "Subsidized TV sets?", Feb. 1998, CED, pp. 1-3.*
Goldberg, Jeff, "Making Your Wireless Quest Easier", Jan. 1998, Point.com, pp. 1-5.*

* cited by examiner

*Primary Examiner* — John Van Bramer
(74) *Attorney, Agent, or Firm* — Haynes and Boone, LLP (57) ABSTRACT

Some described embodiments provide for selecting (e.g., by a server computer from a plurality of transaction records), a transaction record associated with a financial account of an account holder. In one example, the transaction record includes an indication of an amount due, by the account holder, for a previous purchase completed by the account holder with a first merchant. Some embodiments provide further for generating a billing statement for the account holder, the billing statement including an indication of the amount due by the account holder for the previous completed purchase and an indication of an acquisition offer, in which the acquisition offer comprises a promise from a second merchant to pay at least a portion of the amount due by the account holder, and transmitting the billing statement to the account holder.

25 Claims, 9 Drawing Sheets

BILLING STATEMENT ISSUER
CUSTOMER DATABASE 300

| CUSTOMER NAME 330 | BILLING ADDRESS 335 | ACCOUNT IDENTIFIER 340 | OUTSTANDING BALANCE 345 | MINIMUM AMOUNT DUE 350 | DUE DATE 355 |
|---|---|---|---|---|---|
| BOB SMITH | 123 MAIN ST. TOWN, STATE 09111 | 1234-1234 | $1,600.00 | $160.00 | 4/15/98 |
| THOMAS JONES | 436 PLAIN ST. CITY, STATE 23555 | 1234-5678 | $250.00 | $25.00 | 4/15/98 |
| SUE JOHNSON | 987 1ST AVE. CITY, STATE 09829 | 1234-9876 | $150.00 | $15.00 | 4/15/98 |
| MARY MARTIN | 876 VINE ST. TOWN, STATE 98765 | 1234-4565 | $350.00 | $35.00 | 4/15/98 |
| JOHN DOE | 345 BROADWAY CITY, STATE 23666 | 1234-2364 | $80.00 | $8.00 | 4/15/98 |

OFFEROR SERVICE PROVIDER RULES DATABASE 400

| OFFER TYPE IDENTIFIER 430 | OFFEROR SERVICE PROVIDER IDENTIFIER 435 | OFFER RULES 440 | MAXIMUM OFFER AMOUNT 445 |
|---|---|---|---|
| 1 | AT&T | OFFER TO PAY UP TO MAXIMUM OFFER AMOUNT OF CUSTOMER'S MINIMUM AMOUNT DUE ONLY OFFER TO CUSTOMERS WITH ZIP CODES BEGINNING WITH 09 | $75.00 |
| 2 | CITIBANK VISA | OFFER TO PAY MAXIMUM OFFER AMOUNT TO CUSTOMER'S ACCOUNT ONLY OFFER TO CUSTOMERS WITH A CREDIT RATING >B | $80.00 |
| 3 | AMERICA ONLINE | IF MAXIMUM OFFER AMOUNT ≥ MINIMUM PAYMENT DUE, OFFER TO PAY CUSTOMER'S MINIMUM PAYMENT DUE ONLY OFFER TO CUSTOMERS WITH ZIP CODES BEGINNING WITH 23 | $25.00 |

FIG. 4

OFFER STATUS DATABASE 500

| ACQUISITION OFFER IDENTIFIER 530 | OFFEROR SERVICE PROVIDER IDENTIFIER 535 | CUSTOMER ACCOUNT IDENTIFIER 540 | STATUS 545 | OFFER AMOUNT 550 | OFFER MAILING DATE 555 | OFFER EXPIRATION DATE 560 |
|---|---|---|---|---|---|---|
| 77777 | AT&T | 1234-1234 | OPEN | $75.00 | 3/15/98 | 4/15/98 |
| 75643 | AT&T | 1234-9876 | ACCEPTED | $15.00 | 3/15/98 | 4/15/98 |
| 78257 | AOL | 1234-5678 | ACCEPTED | $25.00 | 3/15/98 | 4/1/98 |
| 72255 | AOL | 1234-2364 | EXPIRED | $8.00 | 3/15/98 | 4/1/98 |

BILLING STATEMENT

Thomas Jones
436 Plain St.
City, State 23555

| CUSTOMER ACCOUNT IDENTIFIER | PAYMENT DUE DATE | MINIMUM PAYMENT DUE |
|---|---|---|
| 1234-5678 | 4/15/98 | $25.00 |

| SERVICE DESCRIPTION | AMOUNT DUE |
|---|---|
| SERVICE A | $100.00 |
| SERVICE B | $50.00 |
| SERVICE C | $100.00 |
| TOTAL OUTSTANDING BALANCE | $250.00 |

810

Can't make ends meet? Simply agree to become a member of America Online by checking the box below, and America Online will pay your minimum payment this month!

☐ YES! I authorize America Online to pay my minimum payment due this month. By doing so, I agree to use AOL as my primary Internet Service Provider.

PAYMENT PROCESSING CENTER
678 NICE PL.
FUNTOWN, USA 06660

CUSTOMER ACCOUNT IDENTIFIER 1234-5678

FIG. 8

BILLING STATEMENT CUSTOMER ACQUISITION SYSTEM

CROSS REFERENCE TO RELATED APPLICATIONS

This application is a continuation of U.S. patent application Ser. No. 13/113,587 filed May 23, 2011 now U.S. Pat. No. 8,458,020 and entitled BILLING STATEMENT CUSTOMER ACQUISITION SYSTEM; which is a continuation of U.S. patent application Ser. No. 11/423,299 filed Jun. 9, 2006, entitled BILLING STATEMENT CUSTOMER ACQUISITION SYSTEM, and now abandoned; which is a continuation of U.S. patent application Ser. No. 11/084,431 filed Mar. 18, 2005, entitled BILLING STATEMENT CUSTOMER ACQUISITION SYSTEM, and now abandoned; which is a continuation of U.S. patent application Ser. No. 09/100,684 filed Jun. 19, 1998, issued as U.S. Pat. No. 6,898,570 on May 24, 2005, and entitled BILLING STATEMENT CUSTOMER ACQUISITION SYSTEM; which is a continuation-in-part of U.S. patent application Ser. No. 08/982,149 filed Dec. 1, 1997, issued as U.S. Pat. No. 6,196,458 on Mar. 6, 2001, and entitled METHOD AND APPARATUS FOR PRINTING A BILLING STATEMENT TO PROVIDE SUPPLEMENTARY PRODUCT SALES. Each of the above applications is incorporated by reference herein in their entirety.

TECHNICAL FIELD

The present invention relates generally to customer acquisition systems and, more particularly, to a method and apparatus for facilitating acquisition of new customers using billing statements.

BACKGROUND

The service economy has grown substantially in recent years. In the long distance telephone market, for example, over two hundred million (200 million) long distance calls are placed, on average, each day in the United States alone. For many such service-based businesses, fixed costs are high and variable costs are low, resulting in high profit margins for incremental customers (each additional customer after a threshold number of customers that are required to pay for fixed cost). Thus, it is clear why long distance carriers and other service providers are so aggressive in their pursuit of new accounts.

In the long distance telephone market, for example, the incremental profits achieved from completing each additional call in excess of a threshold number of calls has been estimated to be as high as ninety eight percent (98%). Accordingly, service providers are constantly searching for new techniques and promotions to acquire new accounts. For example, as an added incentive to open or maintain an account, many long distance carriers offer reward programs, such as the True Rewards™. program offered by AT&T, that provide subscribers with discounts and free gifts. In addition, many long distance carriers offer additional incentives to encourage a potential new customer to switch long distance carriers. For example, many long distance companies will mail a check to a potential customer to encourage that customer to switch his or her long distance carrier. If a potential customer cashes the check, the endorsement on the check also serves as an authorization to change the customer's long distance provider.

Many service providers attempt to lure new customers with various direct marketing promotions. Service providers, such as long distance carriers and credit card issuers, initially identify potential customers and then typically send many different mail solicitations to each targeted customer. During 1996 alone, credit card companies mailed out more than two billion unsolicited offers for new credit cards to U.S. households, in addition to placing tens of millions of telemarketing phone calls, in an attempt to acquire cardholders.

While a number of service providers have been successful in obtaining valuable new customers with such direct marketing approaches, it has been found that the vast majority of customers ignore such promotions in view of the overwhelming number of promotions received and the failure of service providers to differentiate their service products and various direct marketing promotions. In fact, a direct-mail campaign is often deemed a success in the industry if the campaign achieves a "response rate" of just three percent (3%). In other words, a direct-mail marketing campaign may be a success even when ninety-seven percent (97%) of mail pieces are inefficiently and wastefully discarded by recipients. Thus, in order to reach valuable new customers, service providers constantly search for more efficient and effective ways to acquire new customers.

The problems and costs associated with current methods for acquiring new customers, however, are not limited to service providers. Even from the customer's point of view, conventional service provider acquisition techniques are unsatisfactory. Many customers are confused, discouraged and annoyed by the repeated attempts of service providers to solicit the customer's business through direct marketing efforts. Specifically, customers would benefit if they received an incentive to switch to a new service provider at a time when the customer was more likely to switch. In fact, if the incentives associated with acquiring new customers were properly offered, customers would be more likely to accept such offers.

The billing statements of various businesses have been used as a mechanism to advertise to account holders. Many merchants pay one or more billing statement issuers for the ability to promote goods and services in promotional materials that are sent with billing statements. For example, New-Sub Services, Inc., of Stamford, Conn., is a merchant that has advertised magazine subscriptions through attachments to billing statements. In this manner, an account holder's billing statement can serve as a medium for advertising to that account holder. Since the customer must theoretically open the billing statement to pay the amount due, the likelihood that the customer will see the advertising message is greatly increased compared to traditional direct mail promotions. In addition, the parent application to the present application discloses an automated system that uses predetermined criteria to print an offer for one or more products to an account holder on a billing statement, and to allow the account holder to purchase those offered products using the billing statement.

Billing-dependent businesses are also concerned with the inability to collect full payment owed by account holders. Such uncollected payments, also called "uncollectable debt", are considered a cost of doing business and consequently decrease the profits of the billing-dependent businesses. Therefore, a reduction in uncollectable debt would be advantageous.

As apparent from the above deficiencies with conventional customer acquisition methods, a need exists for a method and system that allows a service provider to more efficiently and effectively acquire new customers. Yet another need exists for a system that allows a billing-dependent business to minimize their amount of uncollectable debt.

SUMMARY

Generally, according to one aspect of the invention, a customer acquisition system is disclosed that allows an "offeror service provider" to acquire new customers by making "acquisition offers" to customers through the billing statements of other businesses, referred to herein as "billing statement issuers." The customer acquisition system uses predetermined criteria to automatically include an acquisition offer on a billing statement or on associated promotional materials, and allows the customer to accept the acquisition offer using the billing statement. Since each billing statement is likely to be read by the customer, the billing statement may be employed to make acquisition offers to existing customers of the billing statement issuer. The customer acquisition system optionally ensures that the customer is not an existing customer of the offeror service provider before extending an acquisition offer.

The amount owed by the customer may determine whether the customer receives an acquisition offer. For example, based on stored rules or other predefined criteria, the acquisition offers can be targeted to customers whose minimum monthly payment is less than, equal to, or even greater than the per-acquisition budget of the offeror service provider. In a further variation, acquisition offers can be targeted to customers based on geographic information, such as zip codes, or historical data, such as credit reports or purchase histories. In this manner, the customer acquisition system allows service providers to target localized markets by using the customer databases of other geographically-oriented service providers, such as utility companies. Thus, the present invention allows an offeror service provider to make an acquisition offer to a billing statement issuer's existing customers, such that the offeror service provider will agree to credit the customer's account with the billing statement issuer, provided that the billing statement issuer's customer becomes a customer of the offeror service provider.

In one embodiment, the customer may accept the acquisition offer, for example, by circling or marking a corresponding "check box" on the billing statement and returning the statement with the payment, if any, to the billing statement issuer. Upon receiving an indication that an acquisition offer was accepted, the offeror service provider is notified to transfer the appropriate funds to the billing statement issuer.

A more complete understanding of the present invention, as well as further features and advantages of the present invention, will be obtained by reference to the following detailed description and drawings.

DETAILED DESCRIPTION

In accordance with the present invention, billing statements are used by an offeror service provider to provide acquisition offers to customers. Many businesses provide their customers with billing statements that include crucial information such as each charge within a period of time, a total amount due and a minimum payment amount. Thus, acquisition offers are very likely to be seen by customers.

Acquisition offers are also more likely to be considered and accepted by customers since customers can easily indicate acceptance on their billing statements. Furthermore, an accepted offer provides a significant benefit: reduction or elimination of a debt shown on the billing statement. Thus, the present invention can result in a significant response rate to a customer acquisition campaign.

Acquisition offers are especially advantageous for people with limited funds. Such people frequently cannot repay all of their bills in a given month or even make the minimum required payments. Consequently, they prioritize their bills based on the value of the corresponding services. For example, if a customer with limited funds feels telephone service is more important than cable television service, he will probably pay the telephone bill rather than the cable bill. However, if the customer is provided an acquisition offer in accordance with the present invention, he is likely to accept since the benefit (reduction or elimination of a debt) typically outweighs the cost (accepting a service, such as switching to a new service provider).

Figure 1:
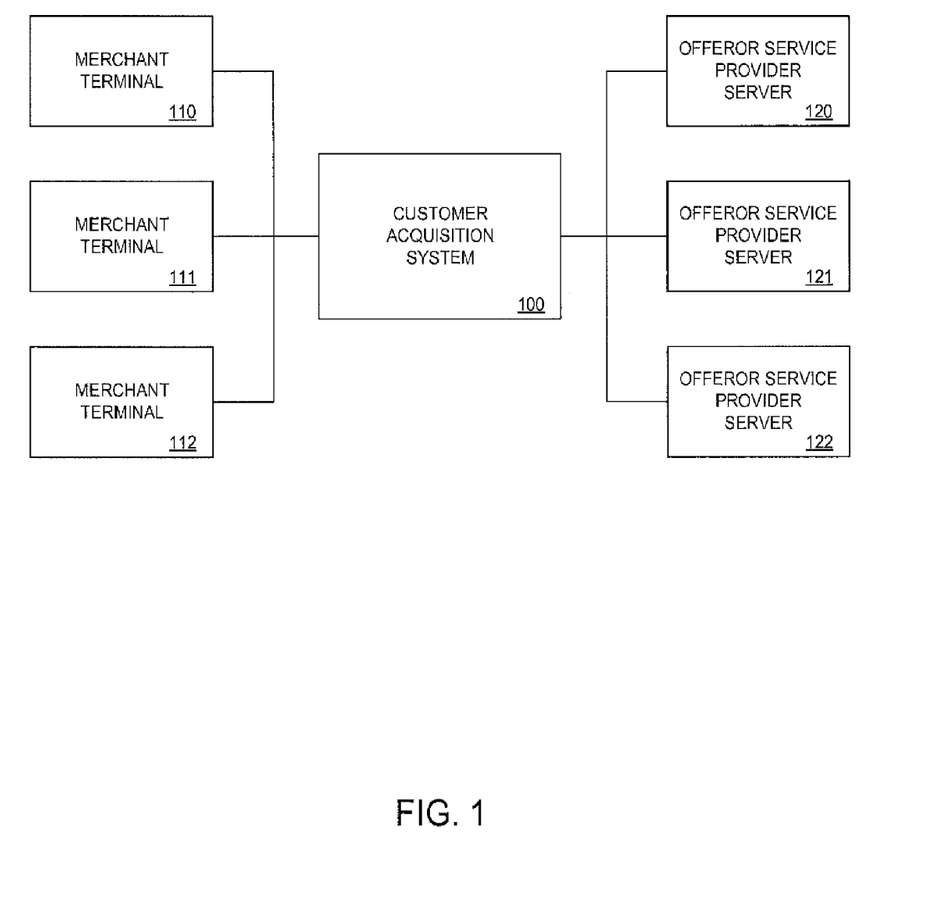
FIG. 1 is a schematic block diagram illustrating a suitable communications network environment for interconnecting a customer acquisition system with one or more merchant terminals and one or more servers associated with offeror service providers.

FIG. 1 illustrates a customer acquisition system 100 associated with a billing statement issuer. The billing statement issuer is typically an entity that has an established relationship with a customer, and that generates one or more billing statements detailing an amount owed by the customer to the billing statement issuer or to a third party. The billing statement issuer may be, for example, a credit card issuer, a department store, a public utility, a cable television provider, a health maintenance organization (HMO), a long distance carrier or an Internet Service Provider (ISP). According to a feature of the present invention, the customer acquisition system 100 is an automated system that uses predetermined criteria to include an acquisition offer on a billing statement or on associated promotional materials, and allows the customer to accept the acquisition offer using the billing statement.

Billing statements typically detail each charge over a period of time, a total amount due, which is calculated by totaling the individual transaction amounts, and a minimum payment amount. For example, credit card issuers provide each of their account holders with a billing statement that lists each transaction, such as purchases and payments, which have been applied against their credit card account. Each transaction listed on the statement (each "billing item") specifies a transaction amount, such as a purchase price debited to the account or a payment credited to the account. Billing items may further comprise merchant-specified text identifying the transaction, such as the merchant's name, address and telephone number. In addition, a billing statement indicates the total amount due, which is calculated by totaling the individual transaction amounts, and a minimum payment amount.

The acquisition offers are made by the billing statement issuer to the customers on behalf of one or more offeror service providers. The offeror service provider is an entity that wishes to acquire new customers. Typically, the offeror service provider is registered with the billing statement issuer to make acquisition offers to the customers of the billing statement issuer. As used herein, an "acquisition offer" is an offer by the offeror service provider to pay an amount owed by the customer to the billing statement issuer as detailed in the billing statement, or a portion thereof, provided the customer agrees to become a customer of the offeror service provider. In one embodiment, the acquisition offer may require the customer to become a customer of the offeror service provider for a predefined minimum period of time or to use a certain minimum dollar amount of the service. The acquisition offers could be funded, for example, by the acquisition budgets of the offeror service providers. In this manner, the billing statement may be employed to make acquisition offers to existing customers of the billing statement issuer, because billing statements are almost certain to be read by the customers.

According to a further feature of the invention, discussed below, the customer acquisition system 100 optionally ensures that the customer is not an existing customer of the offeror service provider before extending an acquisition offer. Thus, as shown in FIG. 1, the customer acquisition system 100 is in communication with servers 120, 121 and 122, each associated with an offeror service provider that is registered with the billing statement issuer to make acquisition offers. Although three servers are illustrated in FIG. 1, those skilled in the art will understand that any number of servers may be in communication with system 100. The customer acquisition system 100 can determine if a customer is already a customer of the offeror service provider. The customer acquisition system 100 communicates with the servers 120, 121 and 122 through any of a number of known communication mediums, such as through the Public Switched Telephone Network ("PSTN"), an Internet connection or a wireless communication medium. The customer acquisition system 100 can (i) communicate in real-time with one or more of the server(s) 120, 121 and 122 before making an acquisition offer to determine if a customer is already an existing customer of the associated offeror service provider(s) (ii) receive periodic updates of the customer lists of each offeror service provider from the servers 120, 121 and 122; or (iii) a combination of the foregoing.

In addition, the amount owed by a particular customer may determine whether the customer receives an acquisition offer. For example, based on stored rules or other predefined criteria, the acquisition offers could be targeted to customers whose minimum monthly payment is less than, equal to, or even greater than the per-acquisition budget of the offeror service provider. In a further variation, acquisition offers can be targeted based on demographic information, such as zip codes, or historical data, such as credit reports or purchase histories. It is noted that the billing statement issuer and the offeror service provider need not be separate entities. For example, a company that provides long distance service to a customer may include an acquisition offer in the customer's long distance billing statement to also serve as the customer's Internet Service Provider. Thus, it is also noted that in such an embodiment, some or all of the functions of servers 120, 121 and 122 may be performed by the customer acquisition system 100.

As shown in FIG. 1, the customer acquisition system 100 is also in communication with one or more merchant terminals 110, 111 and 112, through any of a number of known communication mediums, such as through the Public Switched Telephone Network ("PSTN"), an Internet connection or a wireless communication medium. In a retail embodiment, each of the merchant terminals 110, 111 and 112 is a data entry device accepting data generated by or on behalf of a merchant, such as a retail store. For example, the merchant terminals 110, 111 and 112 may be point-of-sale computers, telephones interfacing with a voice response unit (VRU) or card authorization terminals. For a more detailed discussion of conventional retail transaction processing, see, for example, the parent application to the present invention, incorporated by reference herein. If the billing statement issuer is a service provider, such as a public utility or a long distance carrier, and does not process retail transactions, one or more merchant terminals may be embodied as a meter that measures the customer's usage of the service provided by the billing statement issuer.

Figure 2:
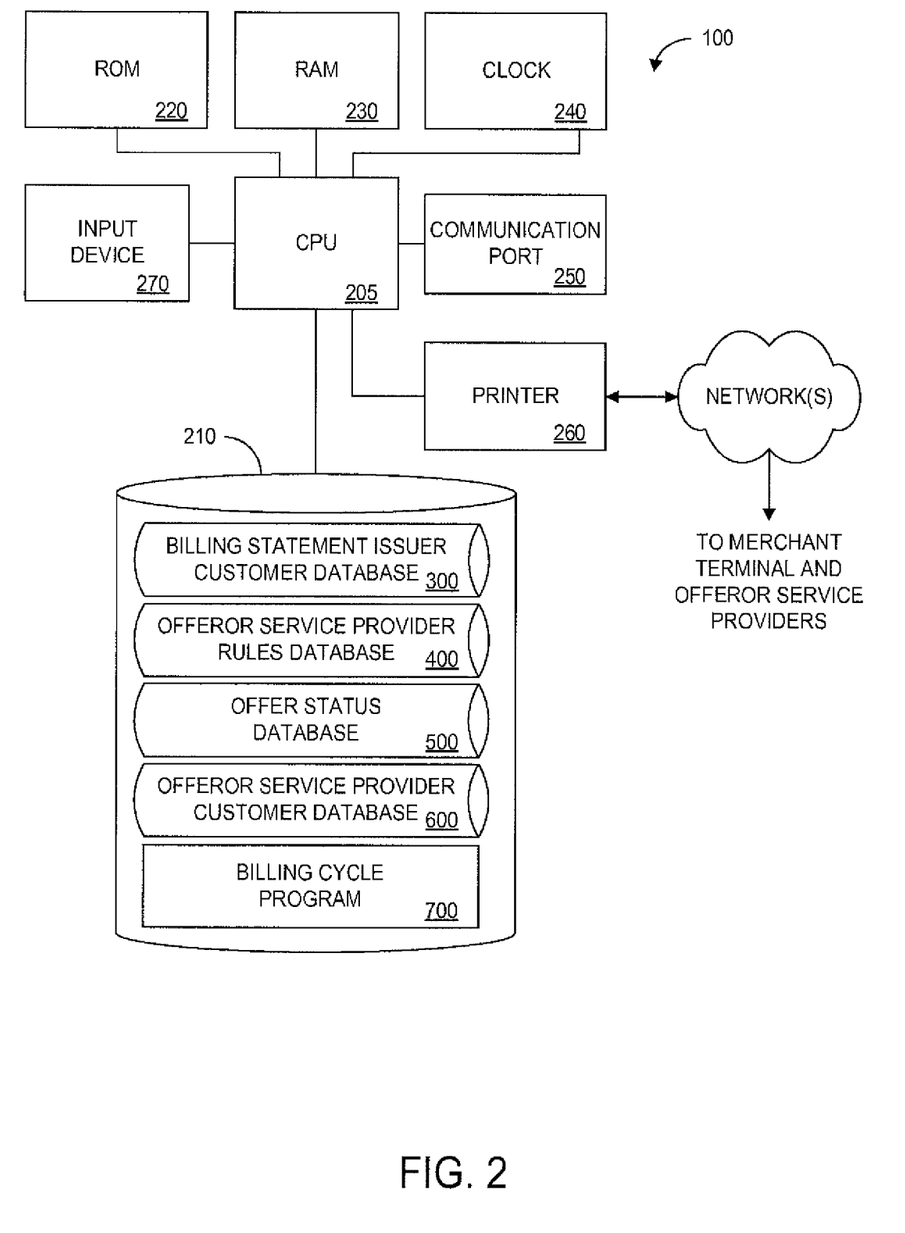
FIG. 2 is a schematic block diagram of the customer acquisition system of FIG. 1.

Referring to FIG. 2, the customer acquisition system 100 includes a central processing unit (CPU) 205 in communication with a data storage device 210, a read only memory (ROM) 220, a random access memory (RAM) 230, a clock 240, a communications port 250, a printer 260 and an input device 270. The CPU 205 can be in communication with the data storage device 210, the read only memory (ROM) 220, the random access memory (RAM) 230, the clock 240, the communications port 250 and the printer 260, by means of a shared data bus or as shown in FIG. 2, dedicated connections. The input device 270 may be embodied, for example, as a keyboard, mouse, joystick or scanner. The communications port 250 connects the customer acquisition system 100 to the merchant terminals 110, 111 and 112 and the servers 120, 121 and 122 of the offeror service providers. The communication port 250 may include multiple communication channels for simultaneous communication with more than one terminal and/or server. The communication port 250 can send and receive offer and account information from customers, offeror service providers and even credit reporting agencies, such as TRW and Equifax. Thus, customers can receive, review and pay their bills, and any associated acquisition offers, entirely online, for example, via electronic mail, without a printed copy of the billing statement.

In one online embodiment, acquisition offers are included in electronic billing statements sent to customers via electronic mail. A customer can thereafter accept an acquisition offer, for example, by sending a reply electronic mail message to the billing statement issuer. In an alternate online embodiment, billing statements can be posted on a web site or electronic bulletin board, where a customer can review his or her billing statement and accept acquisition offers. Thus, as used herein, the phrase "printed on a billing statement" includes acquisition offers printed directly on billing statements or on promotional materials associated with the billing statement or acquisition offers included in billing statements distributed in an electronic format, for example, by means of electronic mail, or posting on a web site or bulletin board.

The CPU 205 may be embodied as one or more processors. The central processing unit (CPU) 205, data storage device 210, and the printer 260 may each be (i) located entirely within a single computer or other computing device; (ii) connected to each other by a remote communication medium, such as a serial port cable, telephone line or radio frequency transceiver; or (iii) a combination thereof. For example, the customer acquisition system 100 may comprise one or more computers which are connected to a remote server computer for maintaining databases or printing large numbers of billing statements.

As discussed further below in conjunction with FIGS. 3 through 6, respectively, the data storage device 210 includes a billing statement issuer customer database 300, an offeror service provider rules database 400, an offer status database 500, and an offeror service provider customer database 600. Generally, the billing statement issuer customer database 300 stores information on each customer of the billing statement issuer, including an identifier of each customer and summary information of the transactions applied against each customer account. The offeror service provider rules database 400 preferably maintains the offer rules for the one or more offeror service providers. Each offer rule defines acquisition offers to extend to customers of the billing statement issuer. The offer status database 500 preferably records each acquisition offer that is made by the customer acquisition system 100 on behalf of offeror service providers. The offeror service provider customer database 600 maintains a list of the customers of each offeror service provider to ensure that an existing customer of the offeror service provider is not extended an acquisition offer. As discussed above, information contained in offeror service provider customer database 600 may alternatively reside at servers 120, 121 and 122 (FIG. 1).

The data storage device 210 and/or ROM 220 are operable to store one or more programs which the CPU 205 is operable to retrieve, interpret and execute. As shown in FIG. 2 and discussed further below in conjunction with FIGS. 7A and 7B, the data storage device 210 includes a billing cycle program 700. The billing cycle program 700 directs the CPU 205 to operate in accordance with the present invention, and particularly in accordance with the methods described in detail herein. Generally, the billing cycle program 700 directs the CPU 205 to generate billing statements that include acquisition offers for customers of the billing statement issuer that are not existing customers of an associated offeror service provider. The billing cycle program 700 also includes program elements that may be necessary, such as "device drivers" for allowing the processor to interface, for example, with the printer 260 and other computer peripheral devices (not shown). Appropriate device drivers and other necessary program elements are known to those skilled in the art, and need not be described in detail herein.

Databases

As will be understood by those skilled in the art, the schematic illustrations and accompanying descriptions of the databases 300, 400, 500, 600 presented herein are exemplary arrangements for stored representations of information to illustrate the principles of the invention. A number of other arrangements and informational content may be employed, as would be apparent to a person of ordinary skill in the art.

Figure 3:
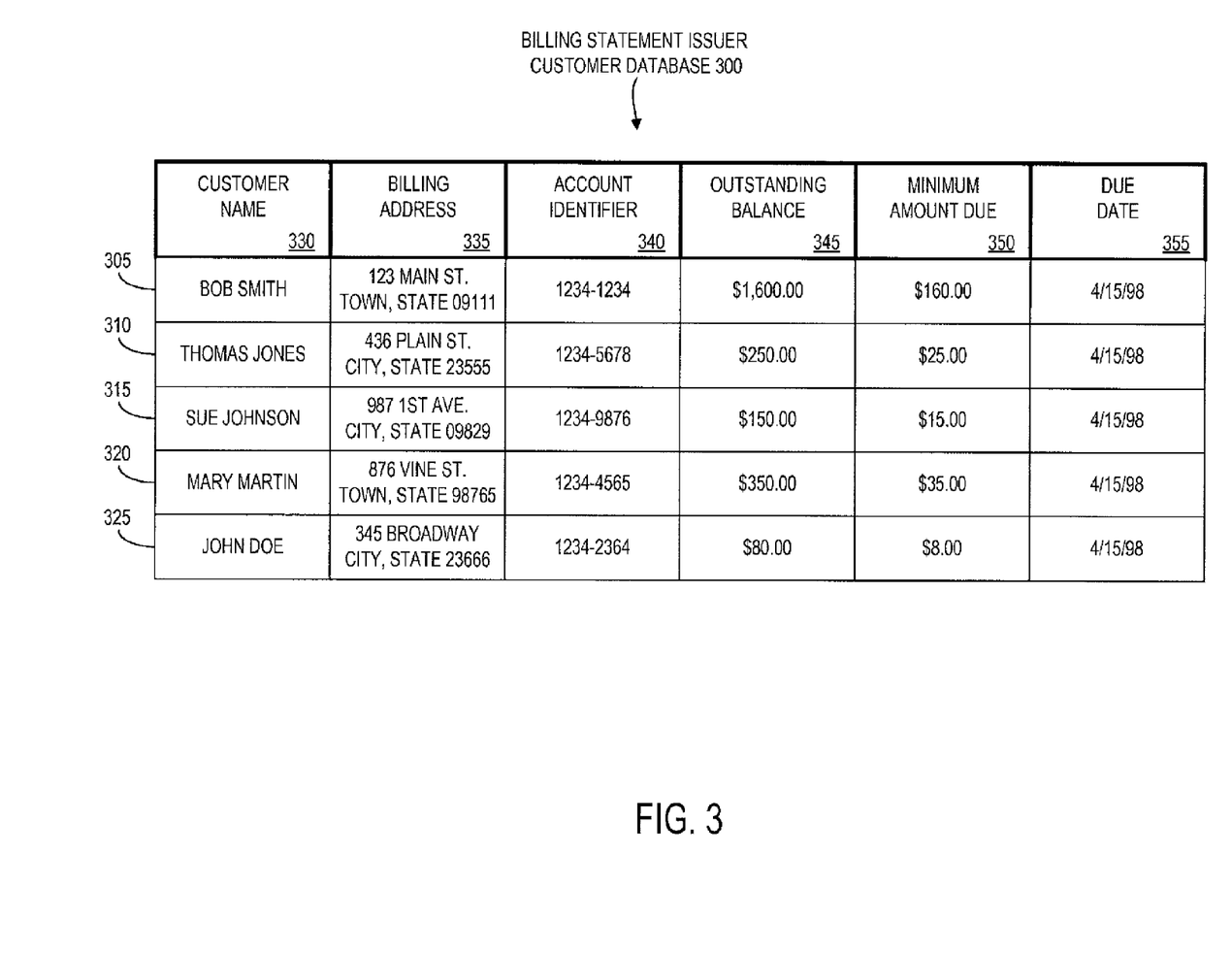
FIG. 3 is a table illustrating the billing statement issuer customer database of FIG. 2.

As shown in FIG. 3, the billing statement issuer customer database 300 typically includes a plurality of records, such as records 305, 310, 315, 320 and 325, each associated with a different customer. For each customer identified by name in field 330, the billing statement issuer customer database 300 includes the customer's billing address in field 335 and an account identifier in field 340. In addition, the billing statement issuer customer database 300 includes the current outstanding balance, minimum amount due and due date for each customer in fields 345, 350 and 355, respectively. As discussed further below, the information stored in the billing statement issuer customer database 300 is used to determine, for each customer, whether an acquisition offer should be extended to the customer on behalf of one or more of the offeror service providers.

Figure 4:
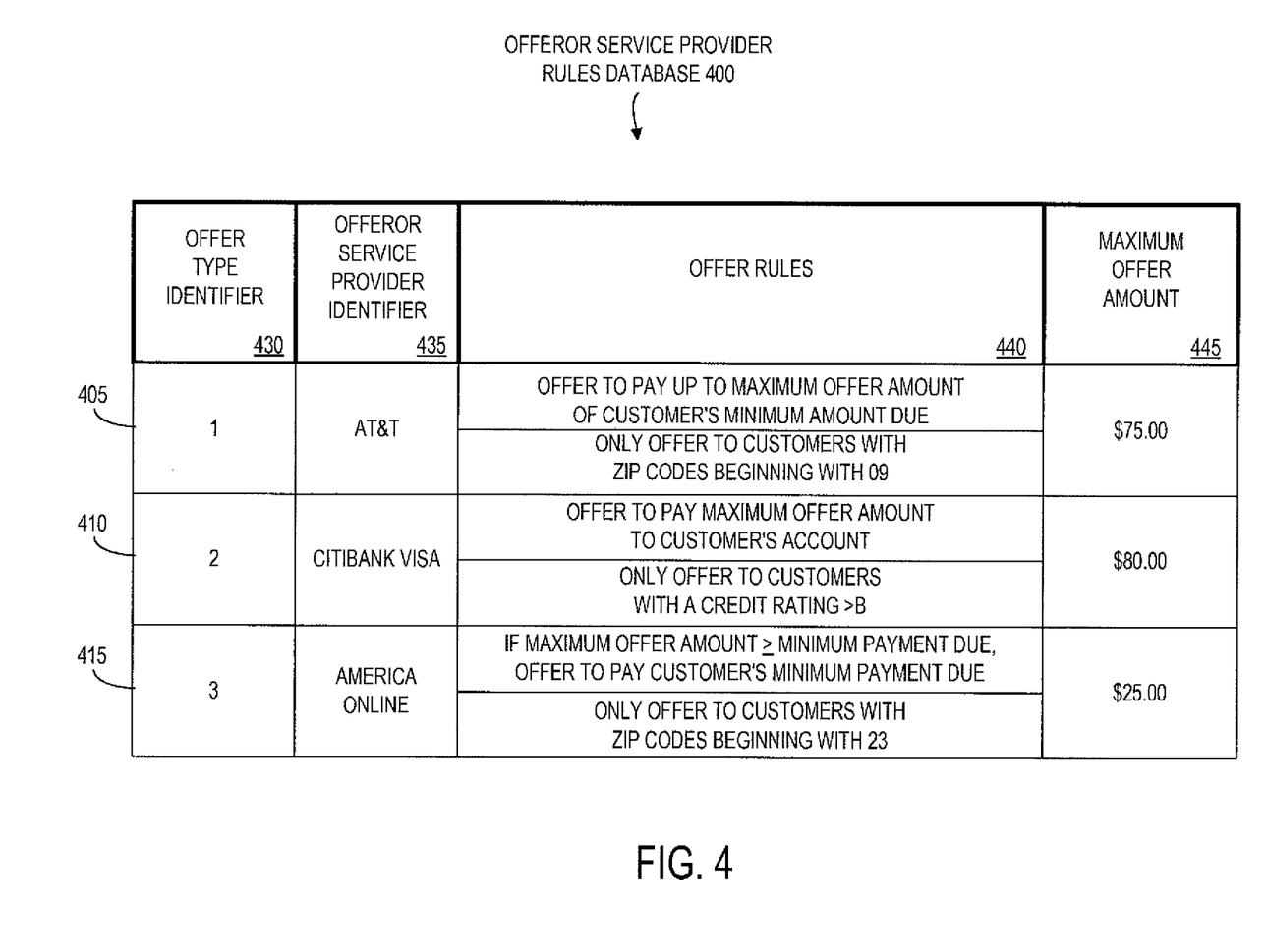
FIG. 4 is a table illustrating the offeror service provider rules database of FIG. 2.

Referring to FIG. 4, the offeror service provider rules database 400 maintains a plurality of records, such as records 405, 410 and 415, each associated with a different acquisition offer. For each acquisition offer type, the offeror service provider rules database 400 includes an offer type identifier in field 430 and an indication of the corresponding offeror service provider in field 435. In addition, the offeror service provider rules database 400 indicates the criteria (rules or requirements) associated with the acquisition offer, and the corresponding maximum offer amount in fields 440 and 445, respectively. As discussed further below, the information stored in the offeror service provider rules database 400 is used to determine whether a potential customer meets the offeror-defined criteria necessary to output an acquisition offer to that customer. As shown in the offeror service provider rules database 400, the maximum offer amount made available by the offeror service providers can be less than, equal to, or even greater than the customer's amount due, at the discretion of the offeror service provider. An offer rule may also specify that the maximum offer amount is always provided. IT will be appreciated that a multitude of other offers and rules may be formulated depending on the business goals of the offeror service provider.

Figure 5:
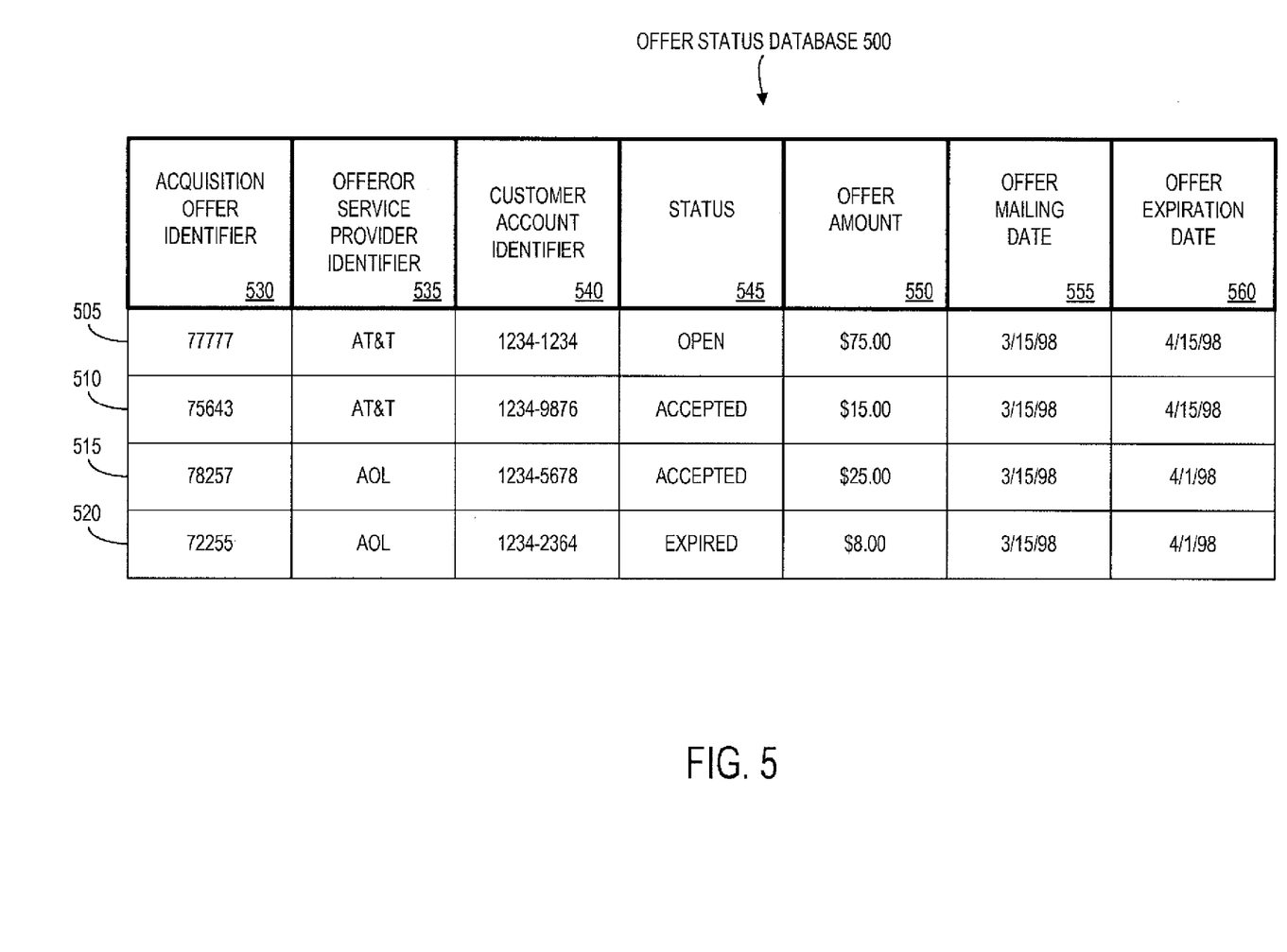
FIG. 5 is a table illustrating the offer status database of FIG. 2.

Referring to FIG. 5, the offer status database 500 maintains a plurality of records, such as records 505, 510, 515 and 520, each associated with a different acquisition offer that has been extended to customers of the billing statement issuer. For each acquisition offer, the offer status database 500 indicates (i) an acquisition offer identifier (number) in field 530; (ii) the offeror service provider identifier in field 535; (iii) the associated customer account identifier in field 540; (iv) the status in field 545; (v) the amount of the acquisition offer in field 550; (vi) the mailing date in field 555; and (vii) the expiration date of the acquisition offer in field 560. In one embodiment, an offer expiration date may be set earlier than the bill due date, in an effort to prompt earlier payment from customers accepting the acquisition offers.

Figure 6:
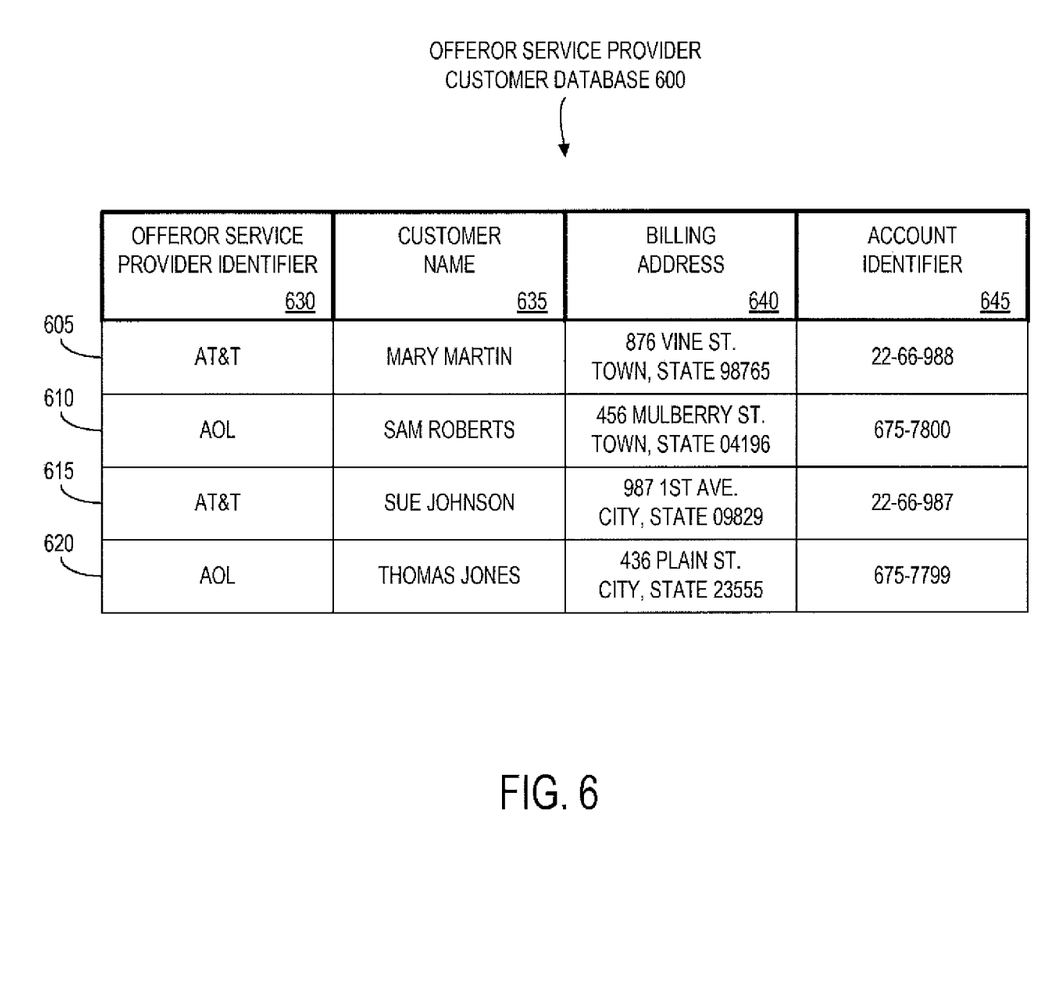
FIG. 6 is a table illustrating the offeror service provider customer database of FIG. 2.

The offeror service provider customer database 600, shown in FIG. 6, contains time-sensitive data. The exemplary data illustrated in FIG. 6 corresponds to a date and time after the offers set forth in records 505, 510, 515 and 520 (FIG. 5) have been accepted and subsequently processed by the customer acquisition system 100. As shown in FIG. 6, the offeror service provider customer database 600 maintains a plurality of records, such as records 605, 610, 615 and 620, each associated with a different customer of each offeror service provider that is registered to make acquisition offers. For each offeror service provider, the offeror service provider customer database 600 indicates a unique offeror service provider identifier in field 630; the corresponding customer name in field 635; and the customer's billing address and account identifier in fields 640 and 645, respectively. Thus, the information stored in the offeror service provider customer database 600 can be used, among other things, to identify existing customers of an offeror service provider and ensure that those existing customers do not receive acquisition offers. Of course, if the customer acquisition system 100 makes inquiries in real-time to the offeror service providers at the time the billing statements are generated, the offeror service provider customer database 600, or at least portions thereof, may not be required or may reside at offeror service provider servers 120, 121 and 122 (FIG. 1). The exemplary customer records 615 and 620 shown in FIG. 6 correspond to new customers of the respective offeror service providers after acquisition offers 510 and 515 (FIG. 5) have been accepted by the respective customers.

Processes

Figure 7A:
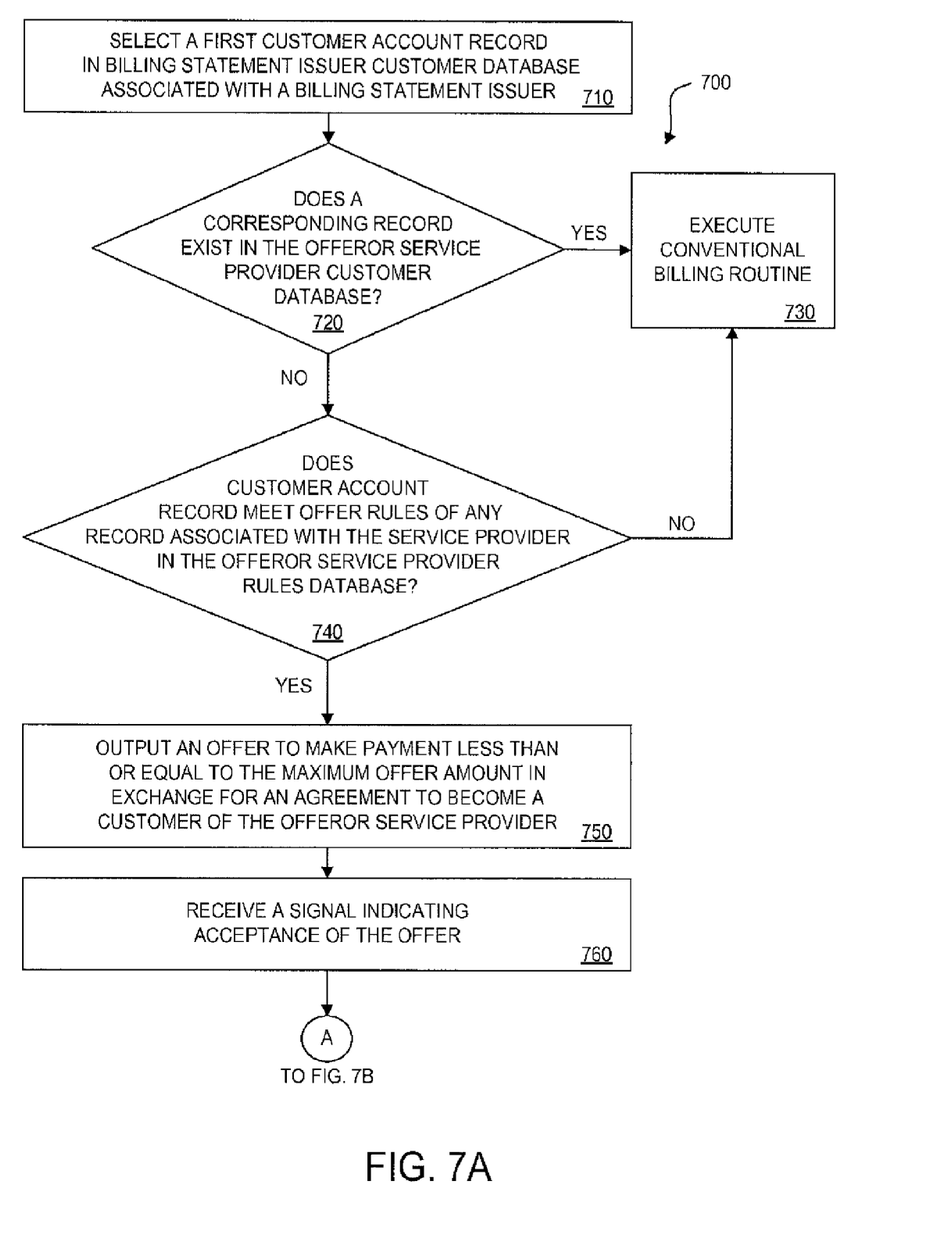
FIGS. 7A and 7B, collectively, are a flow chart describing an exemplary billing cycle process implemented by the customer acquisition system of FIG. 2.
Figure 7B:
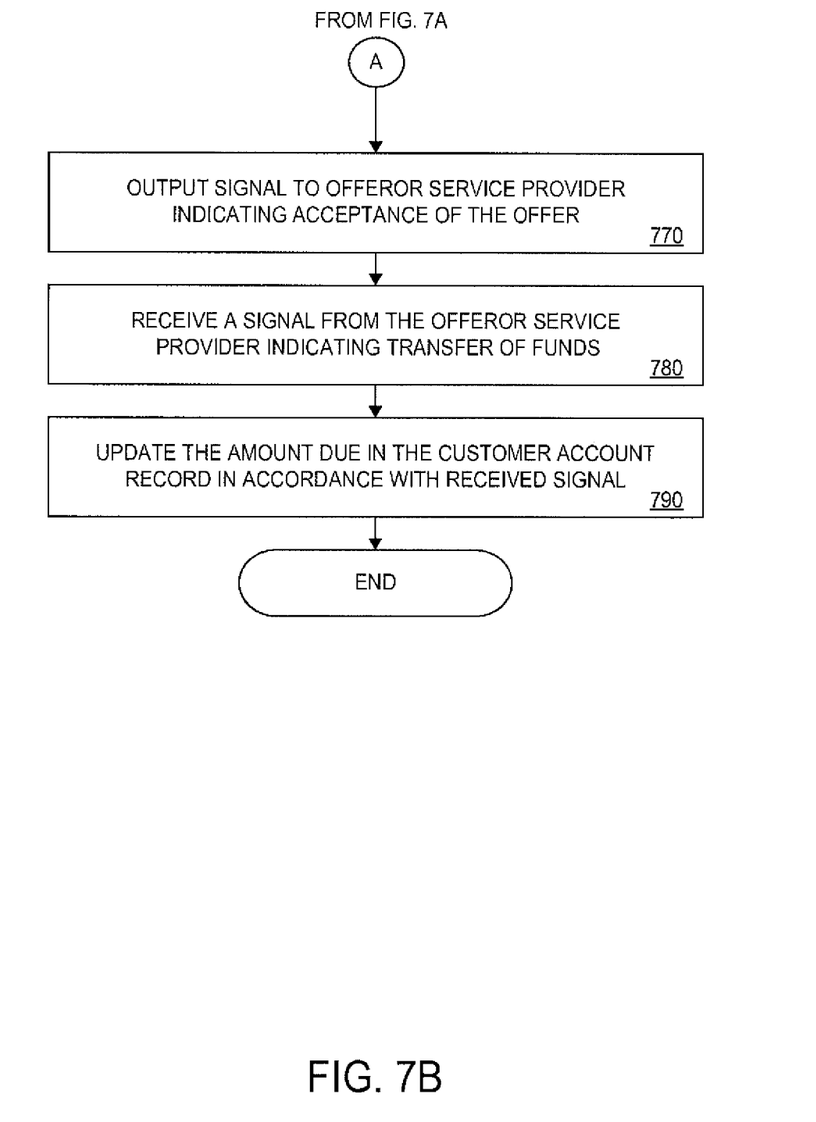

As discussed above, the customer acquisition system 100 may execute a billing cycle program 700, described by the flowchart in FIGS. 7A and 7B, to generate billing statements that optionally include acquisition offers for customers. In one embodiment, the program 700 further assures that the customers receiving acquisition offers are not existing customers of the associated offeror service provider. As shown in FIG. 7A, the billing cycle program 700 can be executed intermittently or at predefined periods to generate billing statements, as required. The description below makes reference to a single customer and a single offeror service provider. Those skilled in the art will understand that the process may also be performed for a plurality of customers and/or a plurality of offeror service providers. The billing cycle program 700 initially selects a first customer account record in the billing statement issuer customer database 300 during step 710. The step 710 of identifying a customer account record may comprise a random selection of a record or selecting the next record in a sequence, as when a predefined group of records are processed.

Thereafter, a test is performed during step 720 to determine if a corresponding record exists in the offeror service provider customer database 600. The test performed during step 720 determines if the customer to be billed is already an existing customer of the offeror service provider. The identifying information for determining if a corresponding record exists may be, for example, a customer name, billing address or other customer identifier. If it is determined during step 720 that a corresponding record exists in the offeror service provider customer database 600, then the customer to be billed is already an existing customer of the offeror service provider, and conventional billing processes are performed during step 730. If, however, it is determined during step 720 that a corresponding record does not exist in the offeror service provider customer database 600, then the customer to be billed is not an existing customer of the offeror service provider, and a further test is performed during step 740 to determine if the customer account record meets the conditions set forth in the offer rules of any record in the offeror service provider rules database 400 that is associated with the offeror service provider. The conditions set forth in the offer rules may be, for example, financial or geographic constraints on the applicability of a given acquisition offer as described and illustrated above.

If it is determined during step 740 that the customer account record does not meet the conditions set forth in the offer rules, then the customer is not eligible to receive any acquisition offers and conventional billing processes are performed during step 730. If, however, it is determined during step 740 that the customer account record meets the conditions set forth in the offer rules, then the customer is eligible to receive an acquisition offer.

An acquisition offer is provided with the billing statement of an eligible potential new customer during step 750. The acquisition offer provides that the offeror service provider will make a specified payment on behalf of the customer to the billing statement issuer up to the offeror-defined maximum offer amount. In exchange, the customer agrees to become a customer of the offeror service provider. In one variation, the customer may be required to agree to become a customer of the offeror service provider for a predefined minimum period of time. As described above, numerous other acquisition offers may be formulated by the offeror service provider, depending on the needs and goals of the offeror.

The billing cycle process 700 receives a signal during step 760 indicating whether the customer has accepted the acquisition offer. The customer may indicate acceptance of the acquisition offer on the billing statement in many ways. For example, a check box may be printed on the statement for each acquisition offer. As used herein, the term "check box" refers to any portion of the billing statement that may be altered by the customer to indicate acceptance of a corresponding acquisition offer. To accept an acquisition offer, the customer may draw a check mark, draw a circle, sign their name, punch a hole, remove a latex scratch-off coating or otherwise alter the corresponding check box. The statement is returned, typically accompanying any additionally-required payment for the account. The returned statement is received and processed to determine whether any check box was altered.

The returned statement may be processed manually or by a machine. For example, predetermined locations of the billing statement corresponding to the check box locations may be optically scanned for indicia of acceptance by input device 270. A signal indicative of whether the acquisition offer was accepted is thereby generated. Alternatively, the statement may be read by a human operator, who in turn enters a signal indicative of whether the acquisition offer was accepted via input device 270. The data entry terminal may be a computer or other device that generates signals in accordance with user input.

Rather than indicating acceptance of an acquisition offer on a returned statement, the customer may also indicate whether the acquisition offer was accepted by transmitting signals via a telephone voice response unit (VRU) or other online interface. As is known in the art, voice response units (VRUs) allow an account holder to respond to queries and enter data by calling a predetermined telephone number and pressing one or more keys of a dual-tone multi-frequency (DTMF) keypad on his or her telephone. In such an embodiment of the present invention, the billing statement would be printed with a telephone number to call in order to indicate acceptance of one or more acquisition offers. Accordingly, the billing statement may further be printed with one or more codes for the account holder to enter (e.g. a unique account holder identifier).

Once the billing statement issuer has determined that the acquisition offer was accepted, the billing statement issuer then transmits a signal to the offeror service provider during step 770 (FIG. 7B) indicating that the customer has accepted the acquisition offer and that the offeror service provider has a new customer. Thereafter, the billing statement issuer receives a signal during step 780 from the offeror service provider indicating the transfer of funds to the billing statement issuer. The signal indicating the transfer of funds may be, for example, in the form of a confirmation of an electronic funds transfer (EFT), a promise to transfer the funds at a future time, or the signal may include an electronic currency. A description of different types of electronic currency may be found in Daniel C. Lynch, "Digital Money, The New Era of Internet Commerce," and Donald O'Mahoney et al, "Electronic Payment Systems." Finally, the billing cycle process 700 updates the amount due in the corresponding record of the billing statement issuer customer database 300 during step 790 in accordance with the received signal. Thereafter, the customer acquisition system 100 may optionally update the corresponding record of the offer status database 500 to indicate that the offer has been "accepted" and may update the corresponding customer's outstanding balance 345 in its own billing statement issuer customer database 300 in accordance with the received signal.

Figure 8:
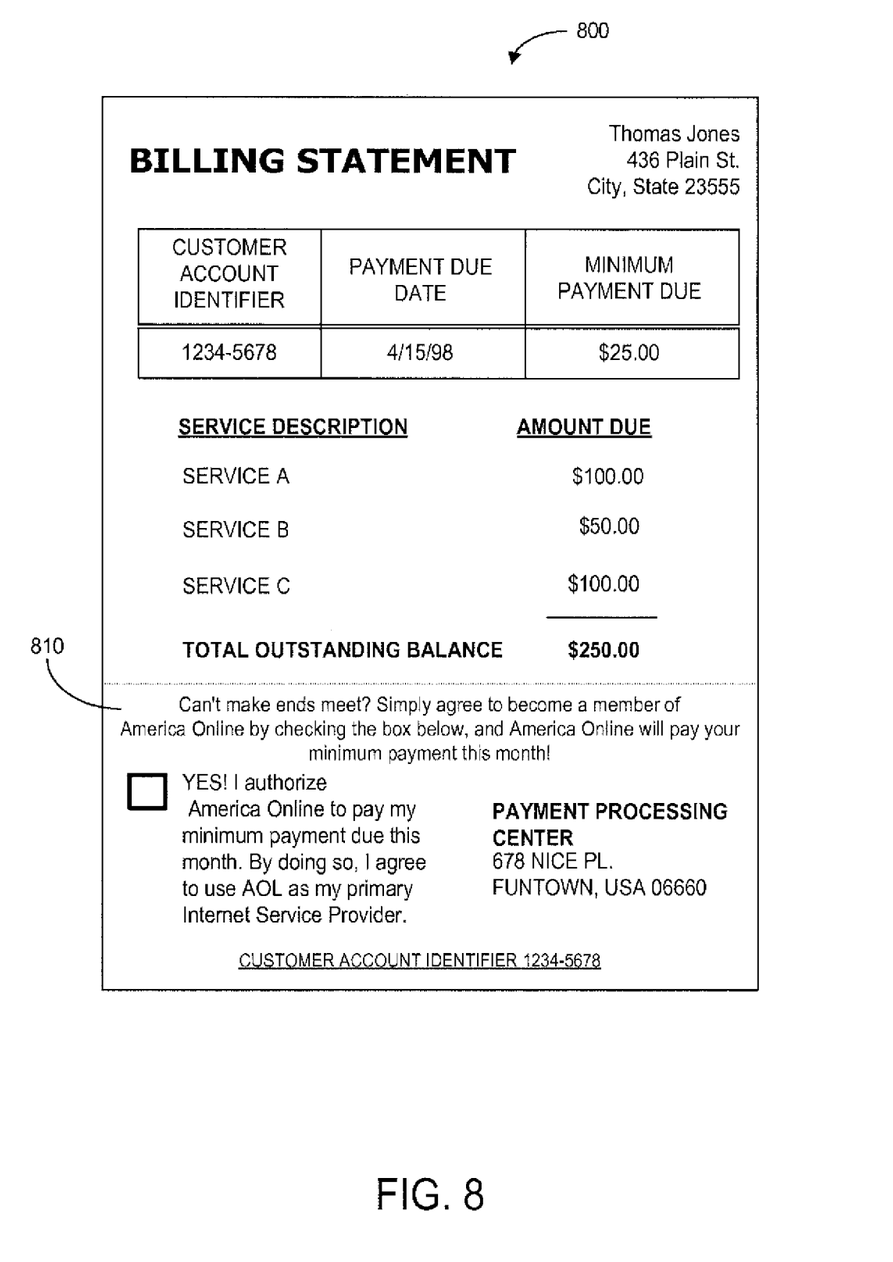
FIG. 8 is an illustrative billing statement produced by the customer acquisition system of FIGS. 1 and 2.

As previously indicated, FIG. 8 provides an illustrative billing statement 800 in accordance with the present invention. The billing statement 800 includes indicia 810 representing an acquisition offer that encourages the corresponding customer of the billing statement issuer to become a customer of the offeror service provider, in this case America Online (AOL). In exchange, AOL will make the minimum payment to the billing statement issuer on behalf of the customer. The billing statement 800 corresponds to customer record 310 of the billing statement issuer customer database 300 (FIG. 3). In addition, the acquisition offer 810 corresponds to the acquisition offer set forth in record 515 of the offer status database 500 (FIG. 5). As also shown by the record 515 of the offer status database 500 and record 615 of the offeror service provider customer database 600 (FIG. 6), the customer (Thomas Jones) accepted the acquisition offer 810, and became a customer of the offeror service provider (AOL).

It is to be understood that the embodiments and variations shown and described herein are merely illustrative of the principles of this invention and that various modifications may be implemented by those skilled in the art without departing from the scope and spirit of the invention.

What is claimed is:

1. A system, comprising:
   a memory storing information about customer accounts, wherein the information comprises transaction history and an account identifier; and
   a processor configured for
      determining that a customer is not an existing customer of a second party;
      generating an offer to the customer who is a customer of a first party and who has purchased from the first party previously, wherein the offer comprises the customer agreeing to become a customer of the second party different than the first party; and
      transmitting the offer electronically to the customer.

2. The system of claim 1, wherein the offer is based on customer purchase history.

3. The system of claim 1, wherein the offer is based on customer geographic information.

4. The system of claim 1, wherein the offer comprises providing the customer a monetary benefit of paying at least a portion of a payment obligation.

5. The system of claim 1, wherein the processor further accepts the offer electronically through email.

6. The system of claim 1, wherein the offer comprises crediting a customer account with a credit card issuer.

7. The system of claim 1, wherein the offer comprises providing a monetary benefit to the customer having an account with an Internet Service Provider.

8. The system of claim 1, wherein the offer is based on an amount owed by the customer.

9. The system of claim 1, wherein the offer comprises providing a monetary benefit of reducing at least a portion of a payment obligation in exchange for the customer becoming a new customer for the same entity in another division.

10. The system of claim 1, the offer is transmitted on an electronic billing statement.

11. The system of claim 1, wherein the offer comprises providing a customer of a billing statement issuer a cash bonus or a credit larger than an amount due.

12. The system of claim 1, wherein the offer expires before a due date of an amount owed by the customer.

13. A non-transitory machine-readable medium comprising a plurality of machine-readable instructions which when executed by one or more processors of a server are adapted to cause the server to perform a method comprising:
   determining that a customer is not an existing customer of a second party;
   generating an offer to the customer who is a customer of a first party and who has purchased from the first party previously, wherein the offer comprises the customer agreeing to become a customer of the second party different than the first party; and
   transmitting the offer electronically to the customer.

14. The non-transitory machine-readable medium of claim 13, wherein, in exchange for the customer agreeing to become a customer of the second party, the second party agrees to pay at least a portion of the amount owed by the customer.

15. The non-transitory machine-readable medium of claim 13, wherein the offer is based, at least in part, on history data of the customer.

16. The non-transitory machine-readable medium of claim 15, wherein the history data comprises purchase history.

17. The non-transitory machine-readable medium of claim 13, wherein the offer is based, at least in part, on geographic information of the customer.

18. The non-transitory machine-readable medium of claim 13, wherein the offer is provided on a billing statement or an invoice.

19. The non-transitory machine-readable medium of claim 13, wherein the transmitting is by email.

20. The non-transitory machine-readable medium of claim 13, wherein the transmitting is onto a web site.

21. The non-transitory machine-readable medium of claim 13, wherein the transmitting is onto a bulletin board.

22. A method, comprising:
   determining, electronically by a processor of a service provider that a customer is not an existing customer of a second party;
   generating, electronically by the processor, an offer to the customer who is a customer of a first party and who has purchased from the first party previously, wherein the offer comprises the customer agreeing to become a customer of the second party different than the first party; and
   transmitting, electronically by the processor, the offer electronically to the customer.

23. The system of claim 1, wherein the processor is further configured for receiving an indication whether the offer was accepted by the customer.

24. The non-transitory machine-readable medium of claim 13, wherein the method further comprises receiving an indication whether the offer was accepted by the customer.

25. The method of claim 22, further comprising receiving, electronically by the processor, an indication whether the offer was accepted by the customer.

* * * * *